United States Patent
Hermosillo Valadez et al.

(10) Patent No.: US 9,460,510 B2
(45) Date of Patent: Oct. 4, 2016

(54) SYNCHRONIZED NAVIGATION OF MEDICAL IMAGES

(71) Applicants: Gerardo Hermosillo Valadez, West Chester, PA (US); Marcos Salganicoff, Bala Cynwyd, PA (US); Matthias Wolf, Coatesville, PA (US); Xiang Sean Zhou, Exton, PA (US); Yiqiang Zhan, West Chester, PA (US)

(72) Inventors: Gerardo Hermosillo Valadez, West Chester, PA (US); Marcos Salganicoff, Bala Cynwyd, PA (US); Matthias Wolf, Coatesville, PA (US); Xiang Sean Zhou, Exton, PA (US); Yiqiang Zhan, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 302 days.

(21) Appl. No.: 13/853,174

(22) Filed: Mar. 29, 2013

(65) Prior Publication Data

US 2014/0294263 A1    Oct. 2, 2014

(51) Int. Cl.
  *G06K 9/00* (2006.01)
  *G06T 7/00* (2006.01)

(52) U.S. Cl.
  CPC ... *G06T 7/0028* (2013.01); *G06T 2207/30004* (2013.01)

(58) Field of Classification Search
  None
  See application file for complete search history.

(56) References Cited

U.S. PATENT DOCUMENTS

| | | | | |
|---|---|---|---|---|
| 6,490,476 | B1* | 12/2002 | Townsend et al. | 600/427 |
| 7,394,946 | B2* | 7/2008 | Dewaele | G06T 7/606 |
| | | | | 345/619 |
| 8,958,659 | B2* | 2/2015 | Chen | 382/294 |
| 2005/0259882 | A1* | 11/2005 | Dewaele | G06T 7/606 |
| | | | | 382/243 |
| 2006/0274885 | A1* | 12/2006 | Wang et al. | 378/65 |
| 2007/0127791 | A1* | 6/2007 | Ernvik | G06F 19/3437 |
| | | | | 382/128 |
| 2007/0167784 | A1* | 7/2007 | Shekhar et al. | 600/443 |
| 2007/0237369 | A1* | 10/2007 | Brunner et al. | 382/128 |
| 2007/0274585 | A1* | 11/2007 | Zhang | G06F 19/321 |
| | | | | 382/132 |
| 2008/0319310 | A1* | 12/2008 | Mukherjee et al. | 600/420 |
| 2010/0021082 | A1* | 1/2010 | Declerck | 382/294 |
| 2010/0135554 | A1* | 6/2010 | Kohlmann et al. | 382/128 |
| 2011/0019885 | A1* | 1/2011 | Bond et al. | 382/128 |
| 2012/0209106 | A1* | 8/2012 | Liang et al. | 600/414 |
| 2013/0135287 | A1* | 5/2013 | McCabe et al. | 345/419 |
| 2013/0163896 | A1* | 6/2013 | Chen | G06T 7/0036 |
| | | | | 382/278 |

OTHER PUBLICATIONS

Lester et al. "A survey of hierarchical non-linear medical image registration", Pattern Recognition, Elsevier, GB, vol. 32, No. 1, Jan. 1, 1000, pp. 129-149.*
Maintz et al. "A survey of medical image registration", Medical Image Analysis (1998) vol. 2, No. 1, pp. 1-36.*

* cited by examiner

*Primary Examiner* — Jason Heidemann (57) ABSTRACT

Disclosed herein is a framework for facilitating synchronized image navigation. In accordance with one aspect, at least first and second medical images are received. A non-linear mapping between the first and second medical images is generated. A selection of a given location in the first medical image is received in response to a user's navigational operation. Without deforming the second medical image, a target location in the second medical image is determined by using the non-linear mapping. The target location corresponds to the given location in the first medical image. An optimized deformation-free view of the second medical image is generated based at least in part on the target location. While the user performs navigational operations on the first medical image, the framework repeatedly receives the selection of the given location, determines the target location using the non-linear mapping, and generates the optimized deformation-free view of the second medical image based at least in part on the target location.

20 Claims, 6 Drawing Sheets

SYNCHRONIZED NAVIGATION OF MEDICAL IMAGES

TECHNICAL FIELD

The present disclosure generally relates to systems and methods for synchronized navigation of medical images.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Digital medical images are constructed using raw image data obtained from such scanners. Digital medical images are typically either a two-dimensional ("2-D") image made of pixel elements or a three-dimensional ("3-D") image made of volume elements ("voxels"). Because of large amounts of image data generated in any given scan, there has been and remains a need for developing image processing techniques that can automate some or all of the processes to determine the presence of anatomical abnormalities in scanned medical images.

In the study and analysis of such medical images, it is often necessary for the radiologist to compare the current study to prior studies of the same subject. The prior studies may be acquired by the same or of different image modality. For example, the radiologist may need to compare and evaluate multiple studies acquired at different times using Magnetic Resonance (MR), Computed Tomography (CT), X-Ray films (XR), Ultrasound (US), Positron Emission Tomography (PET), etc.

It is a highly challenging task to accurately relate information in images that are acquired by different scanners at different times. This is because different modalities have widely different intensity and contrast responses to the different tissue types. In addition, different modalities employ different image formation processes that give rise to modality-specific spatial resolution, field of view and noise characteristics. Even further, some modalities (e.g., MR, CT, PET, etc.) produce a 3D volume of data, while other modalities (e.g., XR, US, etc.) produce 2D images. The task of identifying which point in one image corresponds to a given point in the other image is typically performed entirely manually, which is very time-consuming and error-prone.

Accordingly, there exists a need to provide an improved framework for facilitating comparison of different images.

SUMMARY

The present disclosure relates to a framework for facilitating synchronized image navigation. In accordance with one aspect, at least first and second medical images are received. A non-linear mapping between the first and second medical images is generated. A selection of a given location in the first medical image is received in response to a user's navigational operation. Without deforming the second medical image, a target location in the second medical image is determined by using the non-linear mapping. The target location corresponds to the given location in the first medical image. An optimized deformation-free view of the second medical image is generated based at least in part on the target location. While the user performs navigational operations on the first medical image, the framework repeatedly receives the selection of the given location, determines the target location using the non-linear mapping, and generates the optimized deformation-free view of the second medical image based at least in part on the target location.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from a domain to another domain, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The present disclosure describes a framework that facilitates the joint study of two or more medical images of a subject. The medical images may be acquired at the same or different times, viewpoints, and/or by the same or different modalities, including but not limited to, magnetic resonance (MR) imaging, computed tomography (CT), helical CT, x-ray, positron emission tomography (PET), PET-CT, fluoroscopic, ultrasound, single-photon emission computed tomography (SPECT), SPECT-CT, MR-PET, etc. In addition, the medical images may include different number of dimensions. For example, one image may be two-dimensional, while another image is three-dimensional.

In accordance with one aspect of the present framework, multiple images are synchronously navigated by generating a non-linear mapping. The non-linear mapping is used to map a given location in the first image to a corresponding target location in the second image. Since the non-linear mapping is merely used to synchronize the navigation of the cursor (or any type of moving pointer that indicates a position), and not applied to deform the second image, the original shape and appearance of any structure or feature in the second image is preserved. This allows the user to easily navigate, compare and study different images without introducing any distortion to the original images. These exemplary advantages and features will be described in more detail in the following description.

Figure 1:
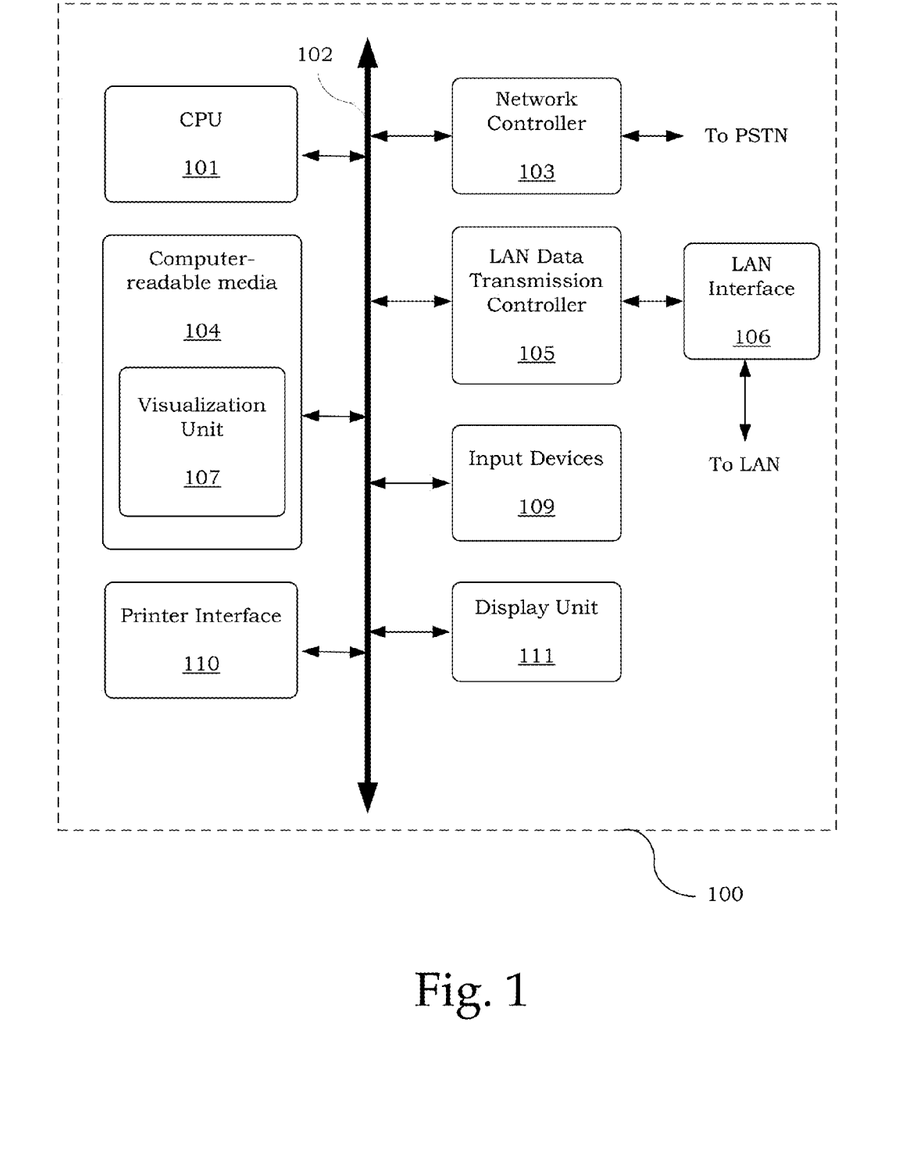
FIG. 1 shows an exemplary computer system.

FIG. 1 shows an exemplary computer system for implementing a method and system of the present disclosure. The computer system referred to generally as system 100 may include, inter alia, a central processing unit (CPU) 101, a non-transitory computer-readable media 104, a printer interface 110, a display unit 111, a local area network (LAN) data transmission controller 105, a LAN interface 106, a network controller 103, an internal bus 102, and one or more input devices 109, for example, a keyboard, mouse, touch screen, etc. Computer system 100 may further include support circuits such as a cache, power supply, clock circuits and a communications bus. Various other peripheral devices, such as additional data storage devices and printing devices, may also be connected to the computer system 100.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein may be implemented as computer-readable program code tangibly embodied in non-transitory computer-readable media 104. In particular, the present techniques may be implemented by a visualization unit 107. Non-transitory computer-readable media 104 may include random access memory (RAM), read only memory (ROM), magnetic floppy disk, flash memory, and other types of memories, or a combination thereof. The computer-readable program code is executed by CPU 101 to process and display images (e.g., MR or CT images) acquired by an imaging device (e.g., MR or CT scanner). As such, the computer system 100 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 104 may be used for storing a knowledge base, individual patient data, database of previously treated patients (e.g., training data), and so forth. The patient records, including associated image data, may be stored in external storage or other memories. The external storage may be implemented using a database management system (DBMS) managed by the CPU 101 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

It is to be understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
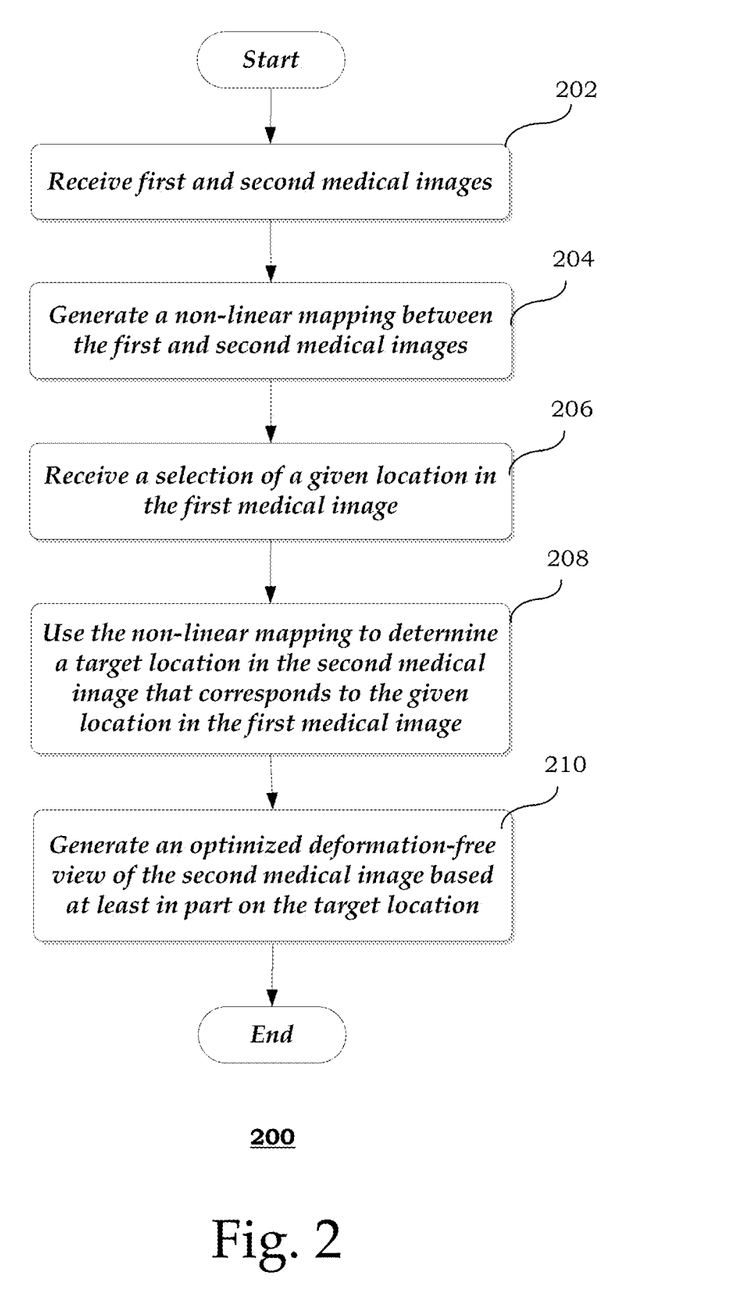
FIG. 2 shows an exemplary method of synchronized image navigation.

FIG. 2 shows an exemplary method 200 of synchronized image navigation. The steps of the method 200 may be performed in the order shown or a different order. Additional, different, or fewer steps may be provided. Further, the method 200 may be implemented with the system 100 of FIG. 1, a different system, or a combination thereof.

As shown in FIG. 2, at 202, at least first and second medical images are received. The first and second medical images include a representation of at least a portion of an anatomical structure (e.g., heart, brain, bone, etc.). The first and second medical images may be acquired using the same modality and from the same patient at different times. This is useful in, for example, monitoring changes in a tumor or lesion in a patient over time. In addition, the first and second medical images may be acquired by different imaging modalities, which may cause the images to have different intensity and contrast characteristics, and/or different numbers of dimensions. For instance, the first medical image may be a three-dimensional CT or MR image, while the second medical image may be a two-dimensional XR or US image.

The first and second medical images may be stored in Digital Imaging and Communications in Medicine (DICOM) format. Any other digital file format may also be used. In addition, the first and second medical images may be received from, for example, a storage device, a database system or an archiving system, such as a picture archiving and communication (PACS) system. Further, the medical images may also be derived from originally acquired image data, such as Maximum Intensity Projection (MaxIP) images, Minimum Intensity Projection (MinIP) images, filtered images, and so forth.

At 204, a non-linear mapping between the first and second medical images may be generated. The non-linear mapping relates the position of a feature in the first medical image to the corresponding position in second medical image. The mapping may be provided in the form of a vector field or matrix.

In some implementations, the non-linear mapping is generated by a non-rigid registration. Registration generally refers to the process of aligning two or more images that represent the same feature. More particularly, registration refers to determining a transformation that can relate the position of features in the first medical image with the position of corresponding features in the second medical image. Rigid registrations involve linear transformations, such as rotation, scaling and other affine transforms, while non-rigid registrations allow elastic or non-linear transformations that are capable of local deformation.

The non-linear mapping may also be generated by a rigid transformation and a non-linear interpolation between landmarks. By explicitly avoiding direct registration between the first and second images, the present framework can advantageously handle images of the same structure that appear very different in the different images. To estimate the rigid transformation and non-linear interpolation, one or more first landmarks in the first medical image may be identified and matched to corresponding second landmarks in the second medical image.

Each landmark is indicative of a predetermined position of a respective feature of the anatomical structure in the medical image. Exemplary features that may be used as landmarks include the center of right and/or left kidneys, vertebrae, femur head, humerus heads, neck, top of the skull, base of the skull, top of lungs, aortic arch, pulmonary trunk, and so forth. These landmarks may be automatically or semi-automatically identified using, for example, a machine learning-based detection technique. Alternatively, the landmarks may be interactively defined or modified by the user. For example, the system 100 may provide a user interface to receive user input (e.g., user-placed marker or location information) identifying or modifying certain first and second landmarks to anchor the non-linear mapping. The framework then automatically generates or re-generates the non-linear mapping in response to the user input. The user may also introduce other types of constraints to the non-linear mapping, such as defining the method of non-linear interpolation, adding or removing landmarks, repositioning landmarks, and so forth. Such user interface facilitates an optimal workflow that enables easy incremental introduction of additional constraints that the system 100 may take into account to improve the non-linear mapping.

The rigid transformation may be estimated based on the first and second landmarks by using any known optimization or other solution space searching techniques to select a transform. After the rigid transformation is estimated, a non-linear interpolation is used to estimate the elastic deformation field between the first and second landmarks. The deformation field may be used to infer correspondence throughout the rest of the first and second medical images in a way that is consistent with the matched first and second landmarks. More particularly, the non-linear interpolation is applied to the coefficients of the rigid transformation to generate a non-linear mapping for every location in the first medical image. Exemplary interpolation techniques that may be applied include, but are not limited to, bilinear, trilinear, B-spline, Gaussian, windowed sinc methods, and so forth. The type of interpolation method may be selected automatically, or by the user as a constraint for determining the non-linear mapping.

At 206, the system 100 receives a selection of a given location in the first medical image in response to a user's navigational operation. The user may perform a navigational operation via the user interface. For example, the user may perform a navigational operation by clicking, or otherwise selecting, the given location as a point of focus in the first medical image. The user may also perform a navigational operation by scrolling through a set of first medical images, such as a series of images (e.g., time series) of the same structure or feature. Other types of navigational operations, such as changing the desired view of the structure (e.g., different plane or orientation, zoom factor, etc.), may also be performed. The different images or views may be synchronized or linked such that as the user scrolls through those images, the given location is automatically set accordingly. The given location may be indicated by a cursor, cross-hair, or any other visual pointer.

At 208, the system 100 applies the non-linear mapping to the given location in the first medical image to determine a target location in the second medical image that corresponds to the given location. The non-linear mapping may be applied to the coordinates of the given location in the first image to generate the coordinates of the corresponding target location in the second image, without deforming the second image. Since the non-linear mapping is not applied to the voxels (or pixels) of the second medical image, the features (or abnormalities) in the second medical image are not deformed. Advantageously, the radiologist can inspect the features (or abnormalities) in their original shapes and appearances in the deformation-free second image. For instance, any lesions appearing in the second medical image will not appear deformed, thereby facilitating detection and comparison.

At 210, an optimized deformation-free view of the second medical image is generated based on the target location. More particularly, the deformation-free view may be optimized based at least in part on the target location. In some implementations, the deformation-free view is optimized by displaying a target cursor, such as a cross-hair or any other visual marker, at the target location in the second medical image.

The deformation-free view may also be optimized by automatically panning the second image such that the given and target locations are at the same position in each respective viewing window. Accordingly, while the navigational cursor moves in the viewing window of the first image, the second image is panned such that target cursor follows the navigational cursor to the same relative position in the viewing window of the second image. In other words, assuming that the origin of each window coordinate system is located at the same position (e.g., lower left corner) of each viewing window, the window coordinates of the given and target locations may be substantially similar after the panning. This helps to maintain the visual focus of the user during synchronized navigation of the images. Alternatively, the second image may be panned such that the target location is centered or at a pre-determined position in the viewing window. The first image may also be translated such that the given location is centered or at a pre-determined viewing window position.

In some implementations, the deformation-free view may be optimized by rendering, for example, a multi-planar reconstruction (MPR) view or three-dimensional (3D) view of the second image. The re-rendered second image may also be translated or panned such that the target location is centered or at a pre-determined viewing window position. In addition, a target cursor may be displayed at the target location in the re-rendered second image. The deformation-free view may further be optimized by automatically adjusting the viewing parameters of the second image. Such viewing parameters include, for instance, the field-of-view (or zoom factor), orientation of the viewing angle, cropping plane (for 3D), window level, color-map, transfer function, and so forth.

Steps 206 through 210 may be repeated while the user performs navigational operations on the first medical image. Such steps may be repeated to update the optimized deformation-free view of the second medical image interactively and in real-time.

Figure 3A:
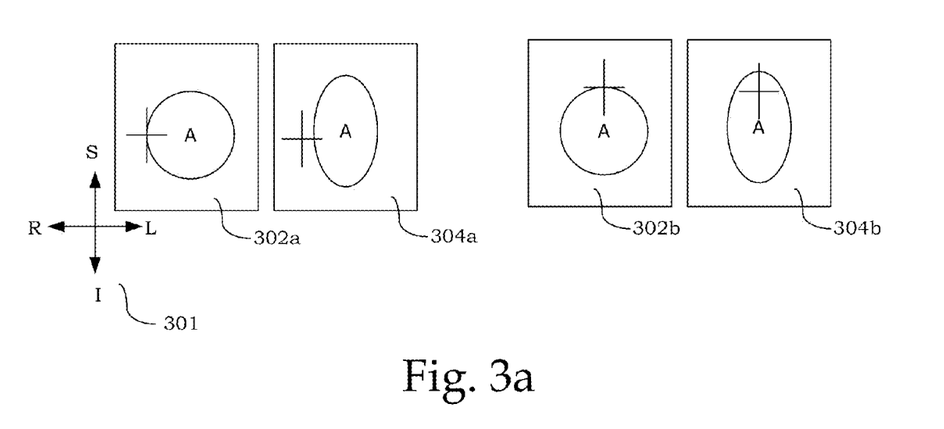
FIGS. 3a-b show image navigation using traditional rigid and non-rigid image registration respectively.
Figure 3B:
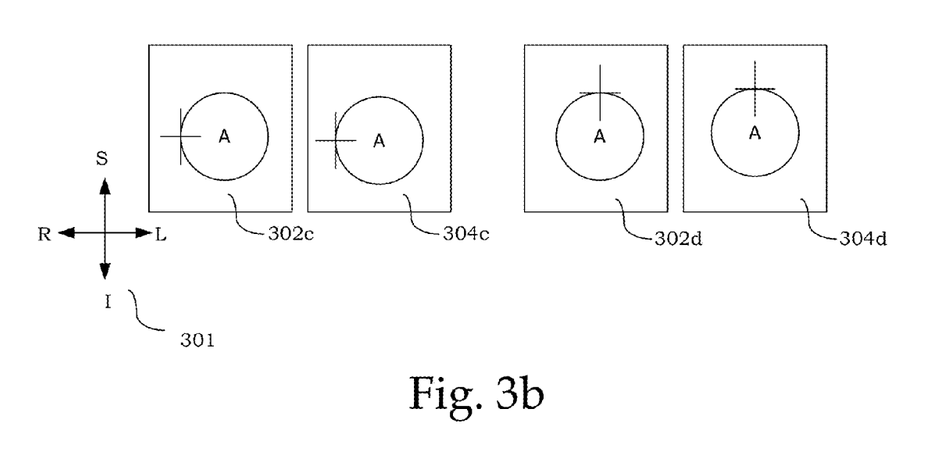
Figure 4A:
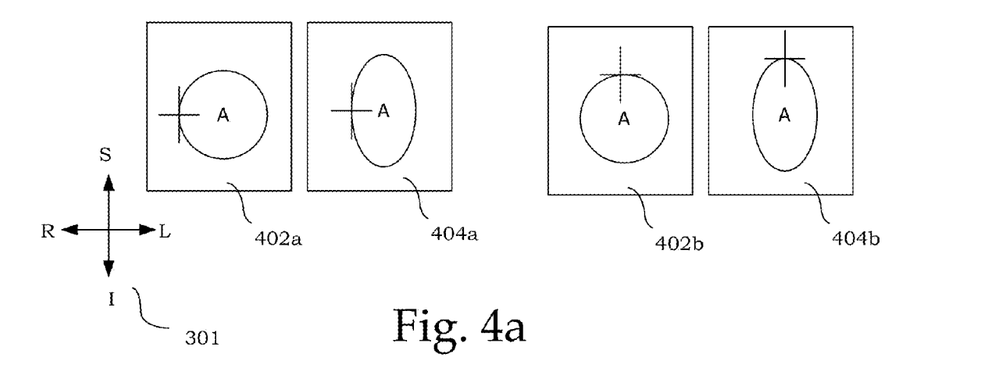
FIGS. 4a-b show image navigation using one implementation of the present framework.
Figure 4B:
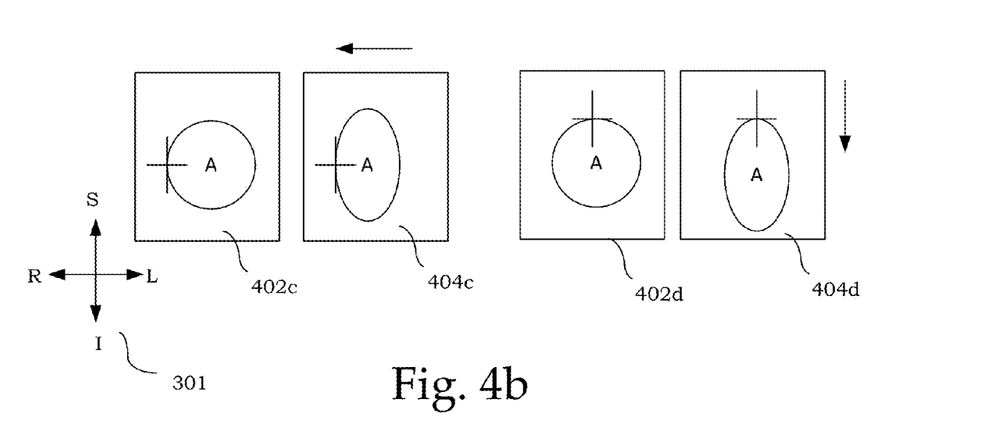

To further illustrate the advantages of the present framework, FIGS. 3a-b show image navigation using traditional rigid and non-rigid image registration respectively, and FIGS. 4a-b show image navigation using one implementation of the present framework. For purposes of illustration, the same feature A is captured in two images (e.g., reference and target images) acquired by two different modalities. Since the underlying physics of acquisition are different for the different modalities, the same feature A may appear relatively different in the original reference and target images. For example, feature A may have a round shape in the reference image, and an oval shape in the target image. Further, it should be noted that the anatomical coordinate system (or patient coordinate system) 301 is used to describe the images in FIGS. 3a-b and 4a-b in the following description. The anatomical coordinate system 301 includes a sagittal plane that separates the Left (L) from the Right (R) and an axial plane that is parallel to the ground and separates the head (Superior or S) from the feet (Inferior or I). Other types of coordinate systems are also useful.

Referring to FIG. 3a, a traditional rigid registration is performed to align a target image (not shown) with the reference image (302a-b), thereby generating a registered image (304a-b). However, since the same feature A has relatively different shapes in the target and reference images, accurate mapping of corresponding cursor locations cannot be obtained by a rigid transformation. For example, the reference image 302a shows a navigational cursor located at a given location at a right side of feature A. In the registered image 304a, the corresponding target cursor is positioned outside, and not at the right side, of feature A. In another example, when the navigational cursor is located at the top side of the feature in reference image 302b, the corresponding target cursor in the registered image 304b is located inside, and not at the top side, of feature A.

Referring to FIG. 3b, a traditional non-rigid image registration is performed to provide additional degrees of freedom so as to take into account the relatively different shape of feature A in the target image. Although the navigational and target cursor locations are accurately matched, deformation is introduced to the shape of feature A in the registered image (304c-d). For instance, feature A may appear oval in the original target image, but round in the registered image (304c-d). This does not allow the user or radiologist to assess the actual appearance of feature A as captured in the original target image.

FIG. 4a shows a first image 402a-b and a second image 404a-b. The first image 402a-b is the original reference image, while the second image 404a-b is the original target image. A non-linear mapping is generated in accordance with one implementation of the present framework, and used to map the given location in the first image 402a-b to a target location in the second image 404a-b, without deforming the second image 404a-b.

As shown, the given and target locations in the first and second images are accurately matched, without introducing any deformation to the appearance of feature A in the second image. For instance, in the first image 402a, the navigational cursor is located at the given location at the right side of feature A. The corresponding target cursor in the second image 404a is also at the right side of feature A. In addition, feature A is not deformed by the non-linear mapping. In another example, in the first image 402b, the navigational cursor is located at the top side of feature A. The second image 404b shows a corresponding target cursor also at the top side of feature A.

FIG. 4b illustrates the translation of the second image 404c-d to help maintain the visual focus of the user. For instance, the second image 404c may be translated to the left so that the navigational and target cursors are at the same position (or share common window coordinates) in each respective viewing window. In another example, the second image 404d is translated downwards such that the navigational and target cursors are at the same window position.

Figure 5:
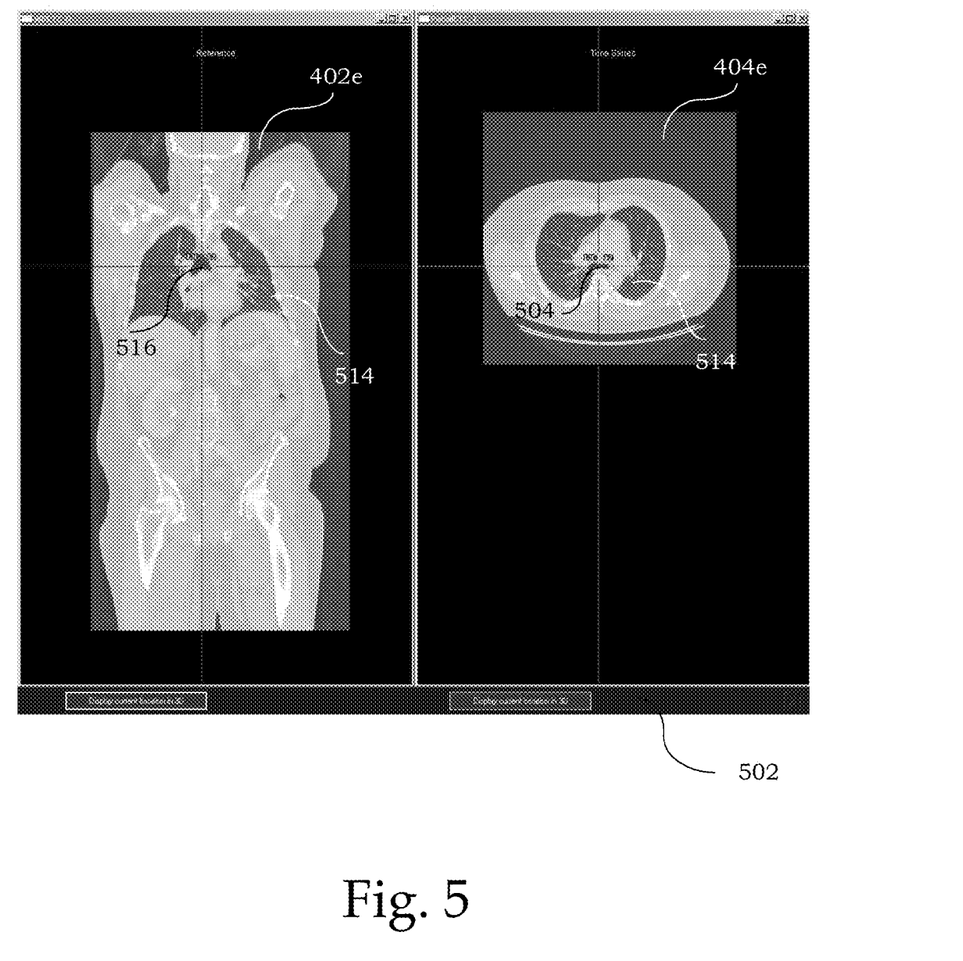
FIG. 5 shows an exemplary user interface in accordance with one implementation.

FIG. 5 shows an exemplary user interface 502 in accordance with one implementation. The user interface 502 displays a set of first medical image (or reference image) 402e and second medical image 404e of an anatomical structure 514. It should be appreciated that more than two medical images may also be displayed and synchronously navigated. The first and second medical images (402e and 404e) may be acquired at different viewpoints, different times and/or by different imaging modalities. As shown, the first medical image 402e may show a coronal view of a CT scan of the subject's chest 514, while the second medical image 404e may be an axial view of a CT scan of the subject's chest 514 acquired at a different time.

Synchronized navigation of the images (402e and 404e) may be performed. The user may choose to perform a navigational operation by moving either the cross-hair 516 in the first image 402e or the cross-hair 504 in the second image 404e. For example, when the user moves the cross-hair 516 in the first image 402e, the cross-hair 504 in the second image 404e may be automatically moved to the corresponding target location. Alternatively, the cross-hair 504 may be in a fixed image position, while the second image 404e is translated or panned. The target location of the cross-hair 504 may be automatically obtained by applying the non-linear mapping generated by the method 200, as previously described with reference to FIG. 2.

The non-linear mapping may be generated automatically or on-demand in response to the user selecting a menu button (not shown) displayed via the user interface 502. The user may also add, delete and/or reposition the landmarks that anchor the non-linear mapping by selecting the corresponding features in the images (402e and 404e). Other constraints may also be added, removed or updated via the user interface 502. The system 100 then automatically updates the non-linear mapping with the new constraints. This may be necessary if, for example, the contour of the lungs is not matched accurately due to respiratory motion, as shown in FIG. 6.

Figure 6:
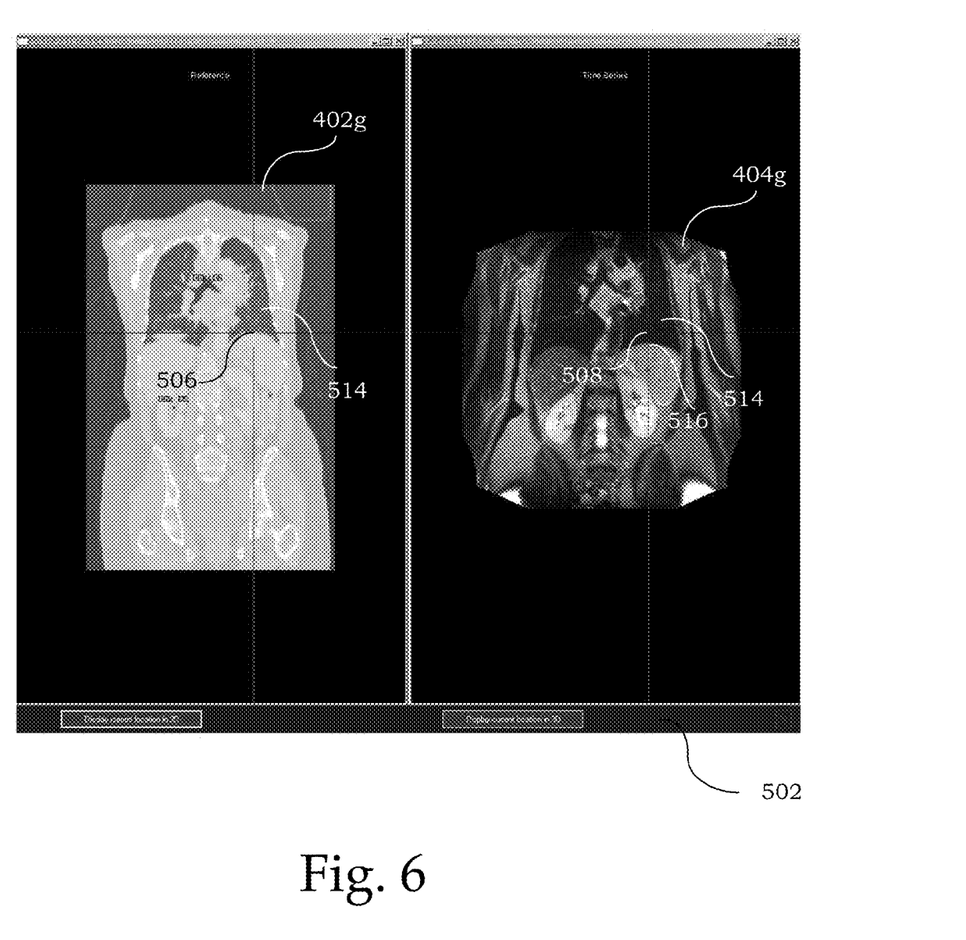
FIG. 6 shows another exemplary user interface in accordance with one implementation.

More particularly, FIG. 6 shows an exemplary user interface 502 displaying first and second images (402g and 404g). In the first image 402g, the navigational cross-hair is located at the bottom location 506 of the left lung 514. Due to respiratory motion, the size of the left lung 514 in the second image 404g is relatively smaller. As such, the corresponding target cross-hair may be mapped to a wrong location 508 inside the lung 514. To correct for this misalignment, the user may add additional anchor landmarks located at 506 and 516 in the two images (402g and 404g) respectively, which correspond to the bottom of the left lung 514.

Referring back to FIG. 5, the first image 402e may be a two-dimensional reference image and the second image 404e may be a three-dimensional time series image. In such case, the cross-hair 504 in the second image 404e becomes a three-dimensional multi-time-point reference point. In other words, the cross-hair 504 always correlates one point in the first image 402e to a fixed target location in the second image 404e across multiple time points, irrespective of the particular view the first or second image may show. For example, as illustrated in FIG. 5, the cross-hair 516 in the coronal view image 402e and the cross-hair 504 in the axial view image 404e map the same points in both windows to the same anatomical feature.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A method of synchronously navigating images, comprising:
   (i) receiving, by a computer system, at least first and second medical images;
   (ii) generating, by the computer system, a non-linear mapping between the first and second medical images in response to addition, re-positioning or deletion of one or more anchor landmarks that anchor the non-linear mapping;
   (iii) receiving, by the computer system, a selection of a given location in the first medical image in response to a user's navigational operation;
   (iv) applying, by the computer system, the non-linear mapping to coordinates of only the given location, without deforming the second medical image, to determine coordinates of a target location in the second medical image that corresponds to the given location in the first medical image;
   (v) generating, by the computer system and based at least in part on the target location, an optimized deformation-free view of the second medical image; and
   repeating steps (iii), (iv) and (v) while the user performs navigational operations on the first medical image.

2. The computer-implemented method of claim 1 further comprising acquiring the first and second medical images using different imaging modalities.

3. The computer-implemented method of claim 1 further comprising acquiring the first and second medical images at different times.

4. The computer-implemented method of claim 1, wherein generating the non-linear mapping comprises performing a non-rigid registration.

5. The computer-implemented method of claim 1, wherein generating the non-linear mapping comprises generating a rigid transformation and a non-linear interpolation.

6. The computer-implemented method of claim 5, wherein generating the non-linear mapping comprises:
   identifying one or more first landmarks in the first medical image;
   identifying one or more corresponding second landmarks in the second medical image; and
   determining the rigid transformation and the non-linear interpolation based on the first and second landmarks.

7. The computer-implemented method of claim 6 further comprising providing a user interface to receive user input of the first and second landmarks.

8. The computer-implemented method of claim 6 further comprising automatically detecting the first and second landmarks.

9. The computer-implemented method of claim 5 wherein the non-linear interpolation comprises B-spline interpolation.

10. The computer-implemented method of claim 1 further comprising providing a user interface to receive user input of one or more constraints and automatically re-generating the non-linear mapping based on the one or more constraints.

11. The computer-implemented method of claim 10 wherein the one or more constraints comprise a type of interpolation method.

12. The computer-implemented method of claim 10 wherein the one or more constraints comprise an added, re-positioned or deleted anchor landmark in the first or second medical image.

13. The computer-implemented method of claim 1 wherein the user's navigational operation comprises selecting the given location as a point of focus in the first medical image.

14. The computer-implemented method of claim 1 wherein generating the optimized deformation-free view comprises displaying a target cursor at the target location in the second medical image.

15. The computer-implemented method of claim 1 wherein generating the optimized deformation-free view comprises panning the second medical image.

16. The computer-implemented method of claim 15 wherein palming the second medical image comprises automatically panning the second medical image such that a target cursor at the target location follows a navigational cursor at the given location to a same viewing window relative position.

17. The computer-implemented method of claim 1 wherein generating the optimized deformation-free view comprises generating a multi-planar reconstruction view of the second medical image.

18. The computer-implemented method of claim 1 wherein generating the optimized deformation-free view comprises generating a three-dimensional view of the second medical image.

19. A non-transitory computer readable medium embodying a program of instructions executable by machine to perform steps for synchronous image navigation, the steps comprising:
  (i) receiving at least first and second medical images;
  (ii) generating a non-linear mapping between the first and second medical images in response to addition, repositioning or deletion of one or more anchor landmarks that anchor the non-linear mapping;
  (iii) receiving a selection of a given location in the first medical image in response to a user's navigational operation;
  (iv) applying the non-linear mapping to coordinates of only the given location, without deforming the second medical image, to determine coordinates of a target location in the second medical image that corresponds to the given location in the first medical image;
  (v) generating, based at least in part on the target location, an optimized deformation-free view of the second medical image; and
  repeating steps (iii), (iv) and (v) while the user performs navigational operations on the first medical image.

20. A synchronous image navigation system, comprising:
  a non-transitory memory device for storing computer readable program code; and
  a processor in communication with the memory device, the processor being operative with the computer readable program code to perform steps for synchronous navigation, the steps comprising:
  (i) receiving at least first and second medical images;
  (ii) generating a non-linear mapping between the first and second medical images in response to addition, repositioning or deletion of one or more anchor landmarks that anchor the non-linear mapping;
  (iii) receiving a selection of a given location in the first medical image in response to a user's navigational operation;
  (iv) applying the non-linear mapping, without deforming the second medical image, to coordinates of only the given location to determine coordinates of a target location in the second medical image that corresponds to the given location in the first medical image;
  (v) generating, based at least in part on the target location, an optimized deformation-free view of the second medical image; and
  repeating steps (iii), (iv) and (v) while the user performs navigational operations on the first medical image.

* * * * *